United States Patent [19]

Castano

[11] 4,317,395

[45] Mar. 2, 1982

[54] LATHE STOP

[75] Inventor: Gregory Castano, Brockton, Mass.

[73] Assignee: Stoughton Tool & Die Co., Inc., Brockton, Mass.

[21] Appl. No.: 180,382

[22] Filed: Aug. 21, 1980

[51] Int. Cl.$^3$ .............................................. B23B 3/36
[52] U.S. Cl. ...................................................... 82/34 D
[58] Field of Search .................. 82/34 R, 34 A, 34 B, 82/34 C, 34 D

[56] References Cited

U.S. PATENT DOCUMENTS

| | | | |
|---|---|---|---|
| 2,392,571 | 1/1946 | Berger | 82/34 D |
| 3,221,581 | 12/1965 | Johansson | 82/34 B |
| 3,998,114 | 12/1976 | Nevery | 82/34 D |
| 4,245,938 | 1/1981 | Kriegl et al. | 82/34 B |

Primary Examiner—Harrison L. Hinson
Attorney, Agent, or Firm—Kenway & Jenney

[57] ABSTRACT

An apparatus for stopping the movement of a lathe cutting tool at a precise spot along a workpiece has a rugged support bracket for mounting securely to the guide track of a moving carriage which bears the tool. A micrometer-adjustable stop member disposed at one end of the bracket interacts with a rotatable turret stop, having multiple interchangeable stop members, located at the opposite end to achieve precise and rapid positioning of the multiple stops. A particular embodiment is suitably configured for lathes with dovetail-bed-type guide tracks.

3 Claims, 2 Drawing Figures

LATHE STOP

BACKGROUND OF THE INVENTION

This invention relates generally to the field of control mechanisms for power tools, and more particularly to a combination stop for limiting the movement of a cutting tool carriage on a lathe.

Generally, in the machining of workpieces using a lathe, a carriage assembly carrying a cutting tool is driven, either manually or automatically, along a guide track, so that the cutting tool can machine a predetermined section of the workpiece. The final position of the carriage and therefore of the cutting tool, along the length of the workpiece, can be set in one of several ways. A common procedure is to fix a dial indicator, or similar gauge, at an appropriate location adjacent the path of the carriage, to monitor the indicator during the travel of the carriage and to terminate movement of the carriage when the desired reading is displayed on the indicator. However, such a procedure is inadequate for the precision machining of multiple pieces of the same dimension, because it is dependent on the skill of the individual operator to slow down and stop the lathe at the precise location time after time.

For such repetitive cuts, a more reliable method for providing a positive stop must be used. For this purpose it is known to secure a structurally rugged member to the frame of the lathe in such a way that the carriage, moving at its normal speed, can impinge on a portion of the member. The mass of the member is such that it can withstand the impact of the carriage without being deformed or otherwise damaged, and it is sufficiently anchored to the frame that it does not shift position when struck. Upon impinging on the essentially immovable member, the carriage stops at a well-defined position. Oftentimes the sudden stop produces a momentary disengagement of the driving means from the carriage to prevent needless damage. Because of the rugged nature of the member and its immovability, the carriage stops at the same precise location, workpiece after workpiece.

In many cases the impacted portion of the member may be continuously adjustable in position to vary the termination point of the cut on the workpiece. Often this adjustment has its own integral scale for example in the form of a micrometer or vernier, to allow changes of a precise amount. Alternatively, some stop members have multiple impact portions, each preset to a different length, which are rapidly interchangeable, for example via a rotatable turret, to define different termination points for different cutting operations on the workpiece. Typically these multiple preset portions require use of an external scale or gauge for precise setting. Such a procedure often is needlessly time consuming and costly.

Therefore it is an object of the present invention to provide a reliable stop for a lathe which combines an incrementally selectable stop assembly with an interacting continuously variable stop element to facilitate rapid and accurate determination of cutting tool stop positions.

SUMMARY OF THE INVENTION

Apparatus in accordance with the present invention is intended primarily for use on a lathe in which a cutting tool is carried along a workpiece by a carriage moving on a guide track. The apparatus forms a positive stop for the carriage, to define precisely the final position of a cut in the workpiece. The apparatus includes a positionable support bracket securely fastened to the lathe, generally transverse to the direction of the carriage movement.

A first assembly mounted at one end of the bracket includes a first stop element disposed within the path of the carriage, and a micrometer adjustment for making continuous positional adjustments of the first stop element by precise distances in a direction parallel to the direction of movement of the carriage. Means are provided for fixing this stop element at selected positions.

A second assembly is mounted at an opposite end of the bracket and includes a turret member rotatably mounted to the bracket. Multiple second stop elements are secured to the turret and are positionable within the carriage path by rotation of the turret. The second stop elements are adjustable in length in a direction parallel to the direction of carriage movement. Each of these second stop elements, when positioned within the carriage path, is so disposed relative to the first stop elements that its precise length can be established by alignment with the micrometer-adjusted first stop element.

For defining the length of a single cut in a workpiece the micrometer-adjustable first stop element generally is used by itself. However, when multiple cuts of different lengths are required, the micrometer-adjustable first stop element is used to preset each of the length-adjustable second stop elements for the appropriate length. In this way after each cut, the rapidly positionable turret is rotated to dispose a different second stop element in the path of the cutting-tool carriage, and so define a different length cut. If necessary, the first stop element can be used in conjunction with the turret-mounted second stop elements to define an additional stop position.

BRIEF DESCRIPTION OF THE DRAWINGS

The advantageous features and objects of the present invention will become evident to those skilled in the art from the following detailed description of a preferred embodiment with the following figures in which.

DESCRIPTION OF THE PREFERRED EMBODIMENT

Figure 1:
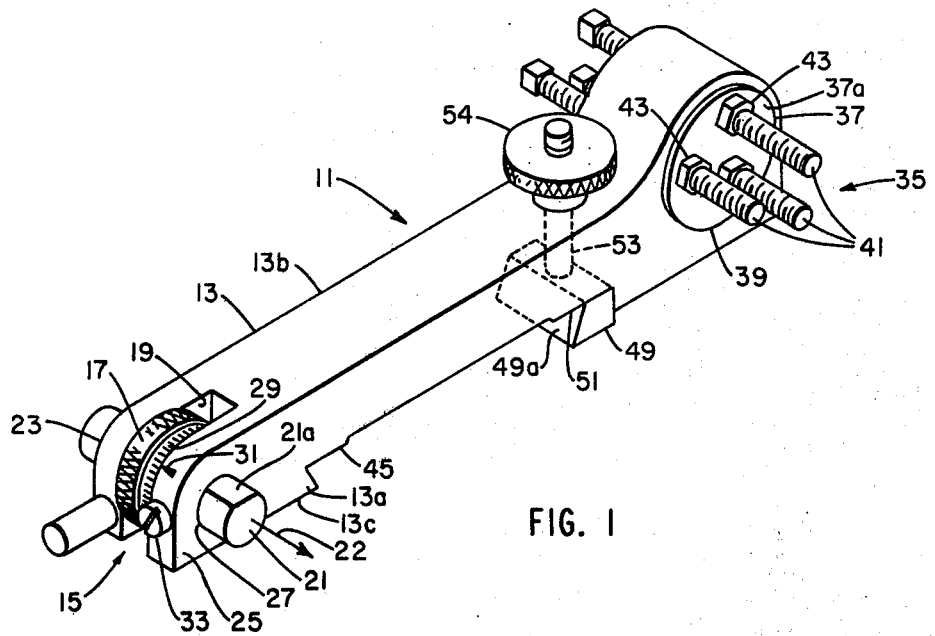
FIG. 1 is a perspective view of a lathe stop apparatus in accordance with the present invention.

Referring to FIG. 1, a lathe stop 11 in accordance with the present invention includes a rugged elongated support bracket 13 which serves both as a mounting base for various components, and as a means for rigidly securing the stop 11 to a lathe. Typically the bracket 13 is machined from an aluminum casting or other material having sufficient structural strength to withstand safely repeated impacts from a lathe carriage. Alternatively the bracket may be fashioned by casting or other appropriate fabrication methods, as the bracket has a planar front surface 13a and a planar back surface 13b generally parallel thereto.

A stop assembly 15 is located at one end of the bracket 13. The assembly 15 includes an adjustment wheel 17 seated within a recess 19 formed in the end of the bracket 13. The wheel 17 has a central threaded circular opening (not shown) which accepts a rigid rod 21 having a matching thread. The rod 21 passes perpendicularly through the wheel 17 and extends into and through arms 23, 25 defined on either side of the recess 19, and emerges perpendicular to surfaces 13a and 13b. The rod 21 does not have a uniformly circular cross section, but has a flattened portion 21a parallel to its length. An aperture 27 in the arm 25, through which the rod 21 protrudes, has a matching shape and it snuggly engages the rod 21 to prevent rotation. In this manner rotation of the adjustment wheel 17 is converted into linear motion of the rod 21 in a direction indicated by an arrow 22. The direction of this linear motion depends on the direction of rotation of the wheel 17, as with any threaded device. Precisely spaced graduations 29, are calibrated in any convenient units of linear measure provided on the outer circumferential surface of the wheel 17. These graduations, in conjunction with a scribed index mark 31, located in the illustrated embodiment on the arm 25, accurately indicate the amount of linear travel of the rod 21 produced by a rotative adjustment of the wheel 17. Such an adjustment mechanism is conventionally known in the prior art as a micrometer adjustment. A set screw 33, oriented perpendicularly to the rod 21 is driven into contact with the rod when necessary to lock the rod 21 in a desired location.

At the opposite end of support bracket 13 is disposed a turret stop assembly 35, a mechanism also known to the prior art. The turret stop assembly 35 includes a generally cylindrical turret base 37 rotatably engaged within a similarly shaped recess 39. In the illustrated embodiment, the length of the turret base 37 is essentially equal to the thickness of the support bracket 13 so that the turret base front surface 37a is coplanar with the bracket front surface 13a, and the turret base back surface 37b (see FIG. 2) is coplanar with the bracket back surface 13b. The turret base 37 is able to rotate freely within the bracket 13, but a conventionally known retaining mechanism (not shown) prevents any movement parallel to its axis of rotation.

Optionally a detent mechanism may be provided to interact with the turret base 37 to lock it into any of several incremental rotative positions.

Three parallel rigid stop rods 41, threadably engage the turret base 37, and extend beyond both the front and back surfaces 37a, 37b thereof. The distance by which each of the stop rods 41 extends beyond these surfaces can be varied by appropriate rotation of each threaded rod. When the stop rods are adjusted to present a desired amount of extension, locking nuts 43 located on each of the rods 41, are rotated into snug engagement with the front face 37a of the turret base to prevent further rotation of the stop rods 41. Each of the stop rods 41 protrudes from the front face 13a of the support bracket 13 in the same general direction as the micrometer adjustable rod 21. With such a relative orientation therebetween, it is possible to align individually each of the rods 41 with the accurately positioned rod 21, in a manner hereinafter described, to match the protruding length of each rod 41 with that of the rod 21. Although the embodiment as illustrated shows only three stops mounted to the turret base 37, any desired number of stops may be used.

In order for the stop 11 to be able to function properly it must be capable of being rigidly mounted in a fixed position on a lathe. Although the stop may be mounted on any convenient location on the frame of a lathe, a particularly suitable location is on the guide track along which a lathe cutting tool-bearing carriage 46 (see FIG. 2) travels. Obviously, stopping the tool-bearing carriage effectively stops the tool itself. In the illustrated embodiment, the stop 11 is adapted to mount to lathes having a "dovetail-bed" type guide track 47 (see FIG. 2), specifically lathes such as the model HLV-H, manufactured by Hardinge Brothers, Inc. of Elmira, N.Y. For such a mounting, a bottom portion 13c of the support bracket 13 has a generally trapezoidally-shaped notch 45 cut therefrom, which matches the contours of the dovetail-bed guide track 47. The support bracket 13 mounts across the width of the guide track 47. The support bracket 13 mounts across the width of the guide track, transverse to the direction of movement of the carriage 46. A movable gib 49, fastened to the underside of the bracket 13 by an adjustment screw 53, has a sloping surface 49a which forms a portion of the notch 45. The adjustment screw 53 controlled by a knob 54 allows the gib 49 to be lowered away from an adjacent surface 51 to facilitate movement away from engagement of the bracket 13 on the dovetail-bed guide track 47. Once the bracket is seated at the desired position on the guide track 47, the screw 53 draws the gib upwardly until the dovetail-bed guide track 47 is clamped firmly between the surfaces 49a and 51.

Although the stop 11 as illustrated is suited specifically for a lathe with a dovetail-bed guide track, it should be noted that, with appropriate modifications it can be adapted to fit lathes having different style guide tracks, such as, for example, a pair of narrow parallel guide rails.

Figure 2:
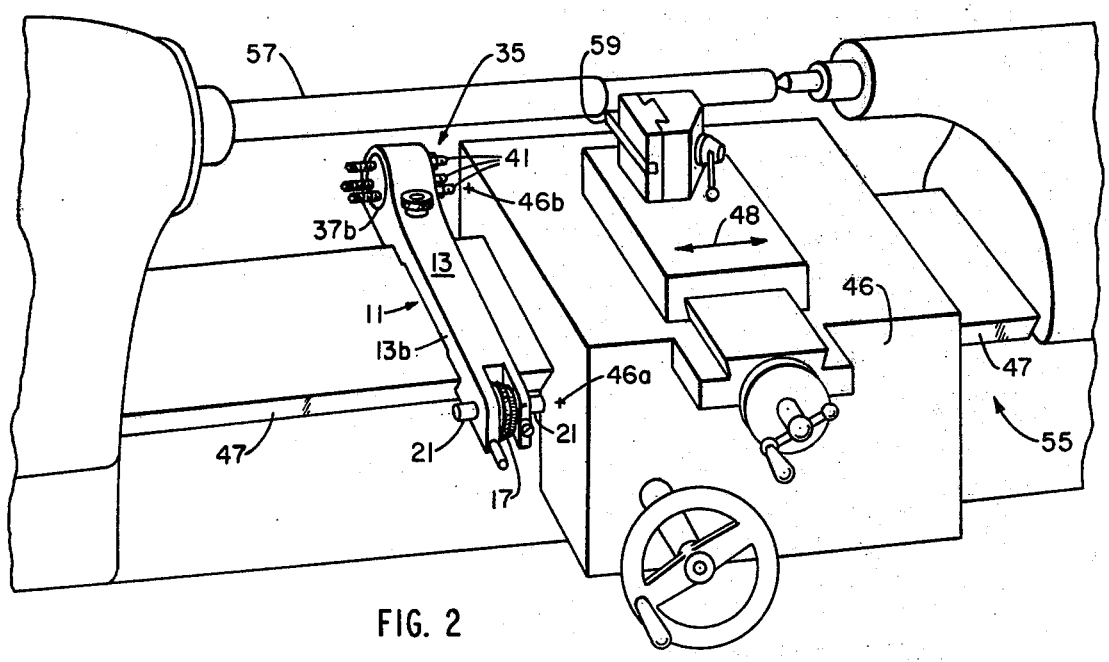
FIG. 2 is a perspective view of the apparatus of FIG. 1 as installed on a typical power lathe.

Referring now to FIG. 2, the operation of the lathe stop 11 when installed is as follows.

A power lathe 55 with a workpiece 57 securely mounted therein, has a workpiece engaging cutting tool 59 borne upon the driven carriage assembly 46. The carriage assembly 46 is driven back and forth along the dovetail-bed guide track 47 in the directions indicated by a double-headed arrow 48, either manually or by any one of several conventional drive mechanisms (not shown). Once the carriage assembly 46 starts to move along the guide track 47 the cutting tool 59 begins to operate upon the workpiece 57 and moves along the length of the workpiece with the carriage. The final position of the cut in the workpiece is determined by the placement of the lathe stop 11 on the guide track 47.

Coarse maneuvering of the stop 11 is accomplished by loosening the gib 49 (see FIG. 1) by means of knob 54, sliding the support bracket 13 along the guide track 57 and tightening the gib upon reaching the desired position. Once the stop 11 is secured, the carriage assembly 46 can be driven until a front face 46a of the carriage strikes the closest point of the stop 11, which typically is either the protruding end of the micrometer adjustable rod 21 or the protruding end of one of the stop rods 41 depending on which is closer to the carriage assembly 46. It should be noted that the turret stop assembly 35 is positioned in the support bracket 13, relative to the carriage assembly 46 such that only one stop rod 41 at a time will be disposed within the path of the carriage 46, and be capable of being struck thereby, depending on the rotative position of the turret base 37. Each time the turret base 37 is rotated, all but one of the stop rods 41 move toward positions beyond the outermost end 46b of the carriage 46 and only one of the stop rods 41 is disposed within the path of the carriage. However, if at any time the rod 21 extends closer to the carriage 46 than does the properly positioned rod 41 then the rod 21 actually determines the point at which the carriage stops.

Fine adjustments of the final position of a cut can be accomplished by use of the micrometer adjustment wheel 17. Distances from a fraction of an inch up to several inches can be gauged accurately, since the calibrated graduations 29 indicate the distance of linear travel of the rod 21.

As positioned on the guide track 47, the rod 21 travels either back or forth in a direction parallel to the movement of the carriage 46 along the guide track 47.

The novel feature of the present invention, however, is the ability to rapidly set up the lengths of each of the multiple stop rods 41 in the turret assembly 35 by aligning each with the stop rod 21, without resorting to use of external gauges or indicators. For example, assume that the operator desires to cut a series of three steps in the workpiece, each step having a length of 0.25 inch along the workpiece, but having a different depth of penetration thereinto. The operator can make the stepped cuts quickly and efficiently by pre-setting each stop rod 41 to achieve the desired length of cut for each step, and rotating the turret base 37, in the proper direction, to position the stops as needed.

For pre-setting the stop rods 41, the cutting tool 59 is placed at the starting point of the first cut, and the micrometer adjustable stop 21 is moved until it stops against the front face 46a of the carriage 46. Then the stop 21 is withdrawn from the face 46a until a total travel of 0.25 inch is indicated on the graduations 29. The carriage is moved until it once again meets the stop 21. The turret base 37 is rotated to dispose the first of the three stop rods 41 in the path of the carriage 46, and the stop rod 41 is adjusted, in the manner described above until it also strikes the front surface 46a. In this way, both the stop 21 and the first stop rod 41 are aligned and matched in length, and both define the same stopping point for the carriage 46. The associated locking nut 43 (see FIG. 1) is used to fix this first stop rod 41 securely in position.

The turret base 37 is rotated to move the already aligned stop rod 41 to an out of the way position, and simultaneously to move a different stop rod 41 into the path of the carriage 46 for alignment purposes. The rod 21 is withdrawn by an additional 0.25 inch and the carriage 46 is brought up again to meet the stop 21. The length of the newly positioned stop rod 41 is adjusted until it strikes the carriage front face 46a, and then is locked in place. The process is repeated for adjustment of the remaining stop rod 41. Upon completion the three stop rods 41 together define three stop positions of the carriage 46, separated by 0.25 inch. As stated above, additional stop positions can be defined by placing more than three stop rods 41 on the turret base 37.

During an actual cutting sequence the operator appropriately rotates the turret base 37 to position the initial stop rod 41 in the path of the carriage 46. The cutting tool 59 moves with the carriage 46 along the workpiece 57 until the carriage strikes the stop rod and ceases movement. The operator again rotates the turret base 37 to position the next stop rod 41 within the carriage path, adjusts the depth of the cut accordingly and starts the movement of the carriage until it is again stopped by this second stop rod 41, and so on. Clearly, the micrometer adjustable stop 21 must be withdrawn sufficiently toward the support bracket 13 so as not to interfere with the operation of the turret stop assembly 35. However, the micrometer adjustable stop 21 also may be used in cooperation with the turret stop assembly 35 to define still another stop position if needed.

Although the present invention has been described with reference to the illustrated embodiment, additional modifications and variations will become apparent to those skilled in the art. Such modifications ahnd variations clearly are intended to be within the scope of the attached claims.

What is claimed is:

1. In a lathe having a cutting tool carried along a workpiece by a carriage moving on a guide track, apparatus for stopping the movement of said carriage to define precisely the final position of a cut in said workpiece, comprising in combination:

a positionable support bracket securely fastened to said lathe, generally transverse to the direction of movement of said carriage;

a first assembly mounted at one end of said bracket, including a first stop element disposed within the path of movement of said carriage, a micrometer adjustment means for making continuous positional adjustments of said first stop element by precise distances in a direction parallel to the direction of movement of said carriage, and means for fixing said first stop element at selected positions; and a second assembly mounted at an opposite end of said bracket, including a turret member rotatably mounted to said bracket, and a plurality of second stop elements secured to said turret member and selectively positionable within said path by rotation of said turret, each of said second stop elements being adjustable in length in a direction parallel to said direction of movement of said carriage.

each of said second stop elements, when positioned within said path, being disposed relative to said first stop element whereby a precise length of said second stop element can be established by alignment with the micrometer adjusted first stop element.

2. Apparatus as set forth in claim 1 wherein each of said second stop elements comprises a screw member threadably engaged within said turret.

3. Apparatus as set forth in claim 1 wherein said carriage guide track comprises a dovetail-bed, and wherein said support bracket engages said bed and further includes an adjustable gib for securely clamping said bracket to said bed.

* * * * *